(12) United States Patent
Clinton et al.

(10) Patent No.: US 9,147,415 B2
(45) Date of Patent: Sep. 29, 2015

(54) HAMR HEAD SPOT-SIZE CONVERTERS WITH SECONDARY INDEX CONFINEMENT

(71) Applicant: HGST Netherlands B.V., Amsterdam (NL)

(72) Inventors: Thomas William Clinton, Danville, CA (US); Barry C. Stipe, San Jose, CA (US); Juraj Topolancik, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 40 days.

(21) Appl. No.: 14/136,414

(22) Filed: Dec. 20, 2013

(65) Prior Publication Data

US 2015/0179197 A1 Jun. 25, 2015

(51) Int. Cl.
*G11B 11/00* (2006.01)
*G11B 5/48* (2006.01)
*G11B 5/00* (2006.01)

(52) U.S. Cl.
CPC ...... *G11B 5/4866* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,369,937 B1 | 4/2002 | Verber et al. | |
| 8,194,509 B2 | 6/2012 | Shimazawa et al. | |
| 8,248,898 B2 | 8/2012 | Schreck et al. | |
| 8,406,092 B2 | 3/2013 | Tomikawa et al. | |
| 8,441,895 B2 | 5/2013 | Shimazawa et al. | |
| 8,456,966 B1* | 6/2013 | Shi et al. | 369/13.33 |
| 2005/0100073 A1 | 5/2005 | Hughes et al. | |
| 2006/0104570 A1* | 5/2006 | Rausch | 385/37 |
| 2007/0230323 A1* | 10/2007 | Nishida et al. | 369/275.4 |
| 2009/0208171 A1* | 8/2009 | Gage et al. | 385/37 |
| 2010/0046083 A1* | 2/2010 | Peng | 359/653 |
| 2010/0061199 A1* | 3/2010 | Hirara et al. | 369/13.24 |
| 2011/0103201 A1* | 5/2011 | Peng et al. | 369/13.24 |
| 2011/0122738 A1* | 5/2011 | Hirata et al. | 369/13.32 |
| 2011/0205660 A1 | 8/2011 | Komura et al. | |
| 2011/0205864 A1* | 8/2011 | Huang et al. | 369/13.33 |
| 2012/0057440 A1* | 3/2012 | Challener et al. | 369/13.32 |
| 2012/0224820 A1 | 9/2012 | Onishi | |
| 2014/0313872 A1* | 10/2014 | Rawat et al. | 369/13.33 |

FOREIGN PATENT DOCUMENTS

WO 03010592 A2 2/2003

OTHER PUBLICATIONS

Osamu Mitomi et al.; "Optical Spot-Size Converters for Low-Loss Coupling Between Fibers and Optoelectronic Semiconductor Devices"; Journal of Lightwave Technology, vol. 14, No. 7 Jul. 1996, 7 pages.

(Continued)

*Primary Examiner* — Peter Vincent Agustin
(74) *Attorney, Agent, or Firm* — Patterson & Sheridan, LLP

(57) ABSTRACT

The present invention generally relates to a HAMR head having not only a tapered core for the SSC, but additionally a secondary confinement material in the cladding surrounding the core taper. The secondary confinement material prevents diverging light from the laser diode from spreading so that the light is coupled into the core of the SSC. The secondary confinement material is a symmetric structure that surrounds the core of the SSC on all sides so that high conversion efficiency is achieved for short taper lengths.

20 Claims, 7 Drawing Sheets

(56) References Cited

OTHER PUBLICATIONS

Fuad E. Doany et al.; "Multichannel High-Bandwidth Coupling of Ultradense Silicon Photonic Waveguide Array to Standard-Pitch Fiber Array"; Journal of Lightwave Technology, vol. 29, No. 4, Feb. 2011, 8 pages.

Yoshida, H. et al.; "A Novel Thin-Overcladding Spot-Size Converter for Efficient Silicon-Wire Optical Interconnections and Waveguide Circuits"; 5th IEEE International Conference on Group IV Photonics, Sep. 2008.

Pu, M. et al; "Ultra-Low-Loss Inverted Taper Coupler for Silicon-On-Insulator Ridge Waveguide"; Optics Communications 283, Sep. 2010.

Tscuhizawa, T. et al.; "Microphotonics Devices Based on Silicon Microfabrication Technology"; IEEE Journal of Selected Topics in Quantum Electonics 11, Jan. 2005.

Kawano, K. et al.; "Design of a Spotsize-Converter-Integrated Laser Diode (SS-LD) with a Lateral Taper, Thin-Film Core and Ridge in the 1.3-m-Wavelength Region Based on the 3-D BPM"; IEEE Journal of Selected Topics in Quantum Electronics, vol. 2, No. 2; Jun. 1996.

Shoji, T. et al.; "Low Loss Mode Size Converter from 0.3pm Square Si Wire Waveguides to Singlemode Fibres," Electronic Letters Online, 38, 1669; Jul. 2002.

Ohira, K et al.; "On-Chip Optical Interconnection by Using Integrated III-V Laser Diode and Photodetector with Silicon Waveguide"; Optics Express 15440, vol. 18, Jul. 2010.

Burns, W. K. et al.; "Optical Waveguide Parabolic Coupling Horns"; Applied Physics Letter 30; Sep. 1976.

\* cited by examiner

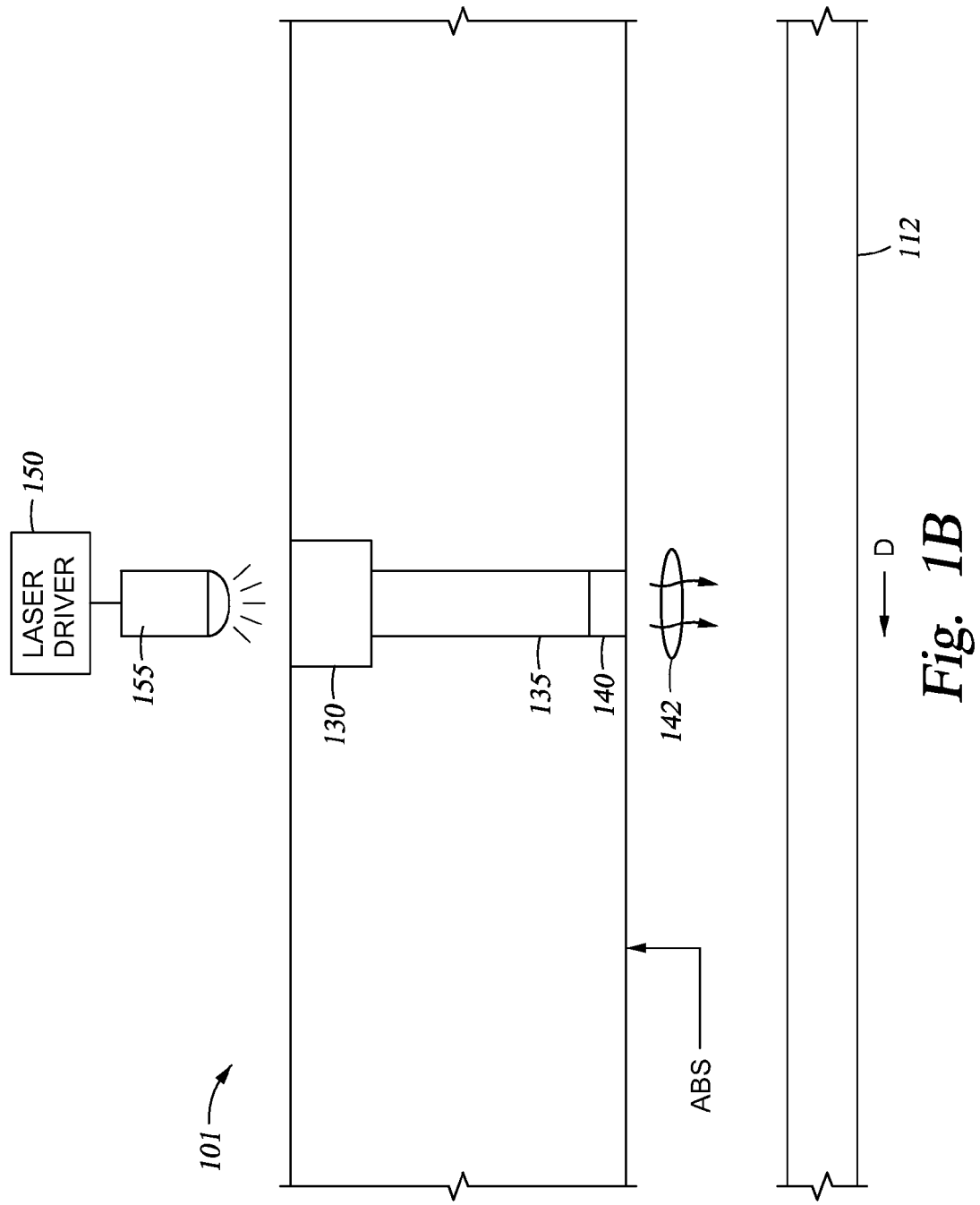

HAMR HEAD SPOT-SIZE CONVERTERS WITH SECONDARY INDEX CONFINEMENT

BACKGROUND OF THE INVENTION

1. Field of the Invention

Embodiments of the present invention generally relate to a heat-assisted magnetic recording (HAMR) head.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or HAMR which are used interchangeably herein. It can be applied to longitudinal and perpendicular recording systems as well as "bit patterned media". Heating of the media surface has been accomplished by a number of techniques such as focused laser beams or near-field optical sources.

HAMR contain two optical components: a microphotonic spot-size converter (SSC) and a near-field transducer (NFT). SSCs transform the output of an external light source, such as a semiconductor laser diode (LD) into a well-confined guided mode that delivers light into the NFT. The NFT is a plasmonic nanoantenna that focuses the light further into an ultra-small spotsize, which is far beyond the diffraction limit, needed for high density magnetic recording. While there are many optical systems capable of performing the transformation, one of the simplest and most efficient realizations involves a taper SSC. Taper SSCs are used to overcome the significant modal mismatch between the free-space beams (or optical fiber modes) and the on-chip photonic components. Tapered SSCs are designed for a particular incident LD input to minimize optical conversion losses. However, even with a tapered SSC, conversion efficiency for the light is less than 40 percent.

Therefore, there is a need in the art for an improved SSC for HAMR heads.

SUMMARY OF THE INVENTION

The present invention generally relates to a HAMR head having not only a tapered core for the SSC, but additionally a secondary confinement material in the cladding surrounding the core taper. The secondary confinement material prevents diverging light from the laser diode from spreading so that the light is coupled into the core of the SSC. The secondary confinement material is a symmetric structure that surrounds the core of the SSC on all sides so that high conversion efficiency is achieved for short taper lengths.

In one embodiment, a heat assisted magnetic recording device comprises a SSC, wherein the SSC includes: a first cladding; a secondary confinement material disposed on the first cladding; a secondary cladding disposed on the secondary confinement material; and a core disposed within the secondary confinement material such that the core is spaced from both the first cladding and the second cladding. The device further includes a waveguide coupled to the spot size converter and a near field transducer coupled to the waveguide.

In another embodiment, a heat assisted magnetic recording device comprises a SSC, wherein the SSC includes: a first cladding; a secondary confinement material disposed on the first cladding, wherein the secondary confinement material is tapered; a secondary cladding disposed on the secondary confinement material; and a core disposed within the secondary confinement material such that the core is spaced from both the first cladding and the second cladding, wherein the core has a taper that is inverse to the taper of the secondary confinement material. The device further includes a waveguide coupled to the spot size converter and a near field transducer coupled to the waveguide.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B illustrate a disk drive system, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a HAMR head having not only a tapered core for the SSC, but additionally a secondary confinement material in the cladding surrounding the core taper. The secondary confinement material prevents diverging light from the laser diode from spreading so that the light is coupled into the core of the SSC. The secondary confinement material is a symmetric structure that surrounds the core of the SSC on all sides so that high conversion efficiency is achieved for short taper lengths.

Figure 1A:
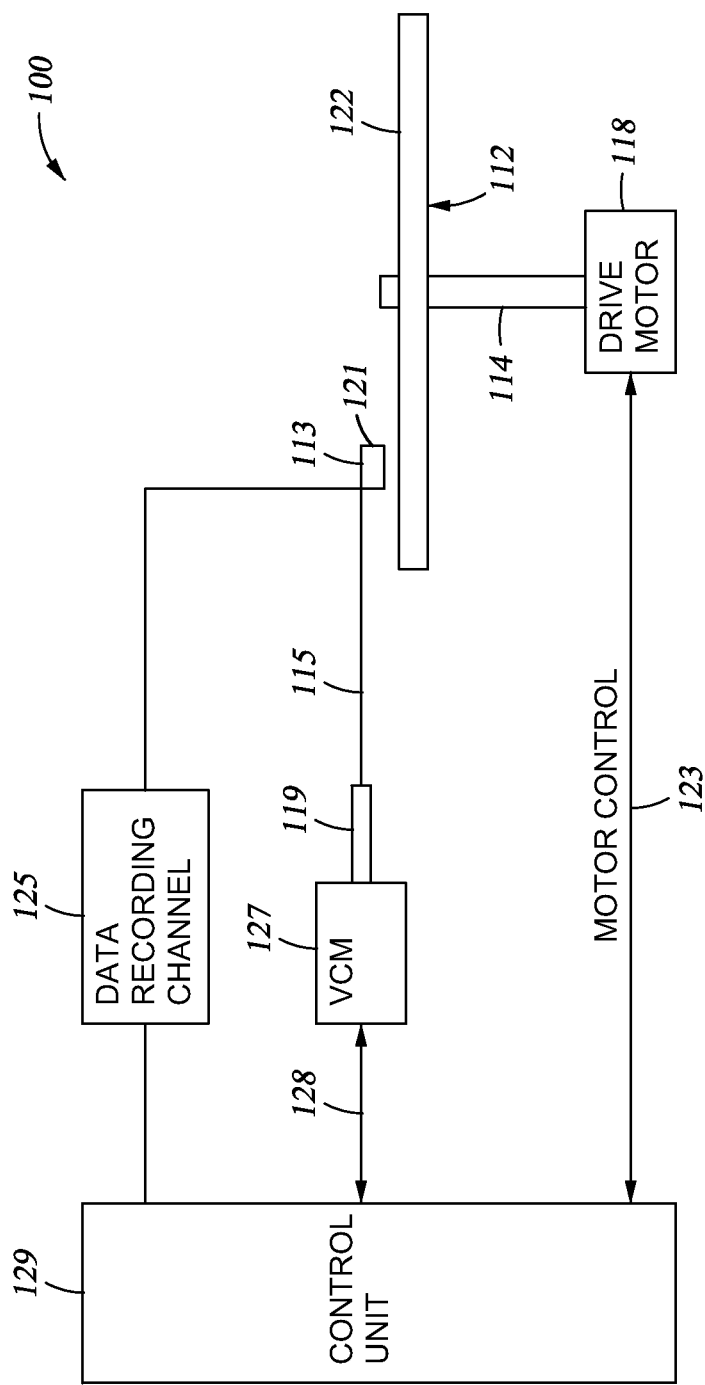

FIG. 1A illustrates a disk drive 100 embodying the invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

FIG. 1B is a cross sectional schematic of a HAMR enabled write head 101, according to one embodiment described herein. The head 101 is operatively attached to a laser 155 (i.e., a radiation source) that is powered by a laser driver 150. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a SSC 130 for focusing the radiation transmitted by the laser 155 into the waveguide 135. In some embodiments, the waveguide 135 is part of the SSC 130, meaning the SSC 130 also functions as a waveguide. In another embodiment, the head 101 may include one or more lens for focusing the beamspot of the laser 155 before the emitted radiation reaches the spot-size converter 130. The waveguide 135 is a channel that transmits the radiation through the height of the head 101 to the optical transducer 140—e.g., a plasmonic device—which is located at or near the air-bearing surface (ABS). The optical transducer 140 (i.e., NFT) further focuses the beamspot to avoid heating neighboring tracks of data on the disk 112—i.e., creates a beamspot much smaller than the diffraction limit. As shown by arrows 142, this optical energy emits from the optical transducer 140 to the surface of the disk 112 below the ABS of the head 101. The embodiments herein, however, are not limited to any particular type of radiation source or technique for transferring the energy emitted from the radiation source to the ABS.

As discussed above, the SSC is used to direct the beam of light to the NFT. The SSC has a taper to focus the light to the NFT such that the light entering the SSC enters at the "skinny" end and is focused at the "fat" end adjacent the NFT. If the SSC is simply surrounded by cladding, some of the light will not be captured and will disperse such that a small amount of light (i.e., less than 40 percent as computed for a simplified model) will actually be focused to the NFT. Secondary confinement material may be used to capture more light. Secondary confinement material is used to surround the core material of the SSC so that the core material is spaced from the cladding material. The cladding material has a first index of refraction while the secondary confinement material has a second index of refraction and the core has a third index of refraction. The third index of refraction is greater than the second index of refraction which is greater than the first index of refraction. In the absence of the secondary confinement material, the core is simply disposed in cladding material, and the SSC has a low conversion efficiency, such as about 35 percent as computed for a simplified model. However, by using the secondary confinement material, the conversion efficiency is increased. It is to be understood that the shapes of the SSC and the components of the SSCs shown and described herein are not limiting as other shapes are contemplated.

Figure 2A:
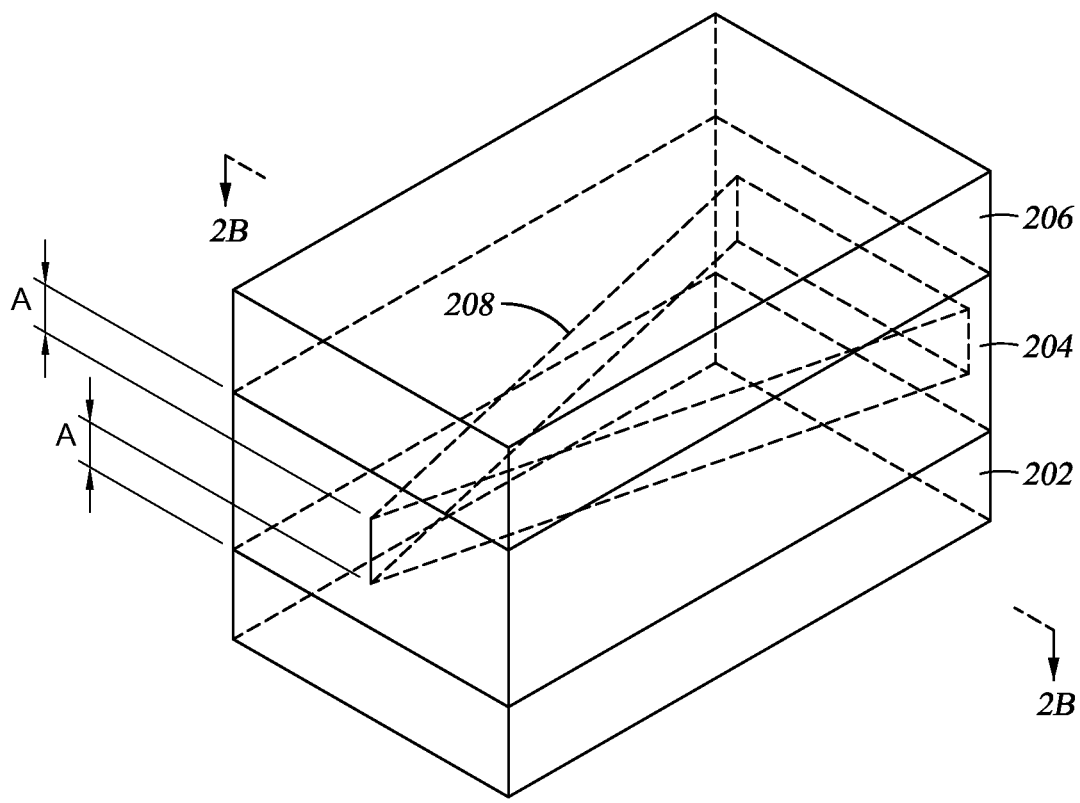
FIG. 2A is a schematic isometric illustration of an SSC according to one embodiment.
Figure 2B:
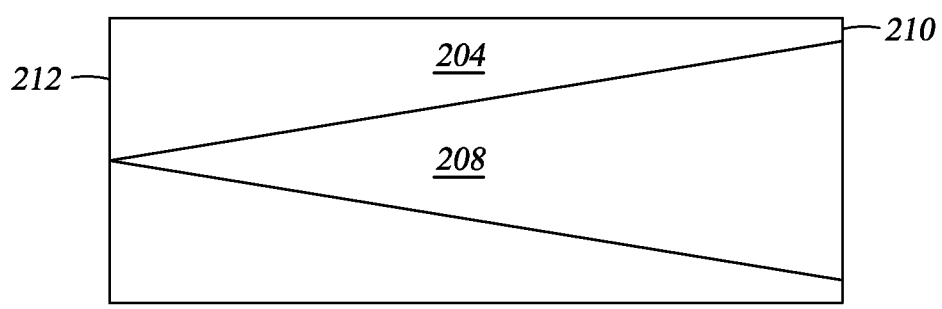
FIG. 2B is a schematic top cross sectional illustration of the SSC of FIG. 2A.

FIG. 2A is a schematic isometric illustration of an SSC 200 according to one embodiment. FIG. 2B is a schematic top cross sectional illustration of the SSC 200 of FIG. 2A. The SSC 200 includes a first cladding 202 comprising a first material and having a first index of refraction. The SSC 200 also includes a secondary confinement material 204 comprising a second material having a second index of refraction that is greater than the first index of refraction. The SSC 200 additionally includes a core 208 disposed within the secondary confinement material 204. The core 208 comprises a third material having a third index of refraction that is greater than the second index of refraction. The SSC 200 finally includes a second cladding 206 disposed on the secondary confinement material 204. The second cladding 206 comprises a fourth material having a fourth index of refraction. In one embodiment, the fourth material and the first material are identical and hence, the first index of refraction and the fourth index of refraction are identical. It is to be understood that it is contemplated that the first and fourth materials can be different and/or have different indices of refraction.

As shown in FIG. 2A, the core 208 is spaced from both the first cladding 202 and the second cladding 206 such that the core 208 is isolated from both. The core 208 is spaced an equal distance from both the first cladding 202 and the second cladding 206 as shown by arrows "A". In other words, the core 208 is symmetrically disposed in the secondary confinement material 204 between the claddings 202, 206. Additionally, as best shown in FIG. 2B, the core 208 extends the length of the SSC 200. The SCC 200 has a first end 212 and a second end 210. The second end 210 is disposed adjacent and NFT and has the "fat" end of the tapered core 208 while the first end 212 has the "skinny" end of the core 208.

The core 208 may comprise electrically insulating material such as silicon nitride, tantalum pentoxide or materials having an index of refraction above about 2.0. The secondary confinement material 204 may comprise alumina, silicon oxynitride, materials having an index of refraction below about 1.95 or an index of refraction that is less than the core 208. The first and second claddings 202, 206 may comprise silicon oxynitride having a higher oxygen content as compared to the silicon oxynitride of the secondary confinement material 204, alumina having a lower index of refraction compared to the alumina of the secondary confinement material 204, silicon dioxide or materials having an index of refraction below about 1.7. In general, the index of refraction for the core 208 should be greater than the index of refraction for the secondary confinement material 204, and the index of refraction for the secondary confinement material 204 should be greater than the index of refraction for the cladding.

In the embodiment shown in FIGS. 2A and 2B, the core 208 is isolated from the first and second claddings 202, 206 and is immersed in the secondary confinement material 204. The secondary confinement material 204 prevents the spreading of the diverging light beam that originates from the light source. The SSC 200 in FIGS. 2A and 2B is a one-dimensional confinement. The SSC 200 is a planar waveguide in which the light is guided by the total internal reflections and thus eliminates the out of plane escape path for the light. The waveguide height can be optimized so that the guided modes overlap spatially with the incident beam. For the SSC 200 in FIGS. 2A and 2B, the conversion efficiency is about 46 percent as computed for a simplified model, which is much better than when no secondary confinement is present. Any light not captured will propogate down the slider.

Figure 3A:
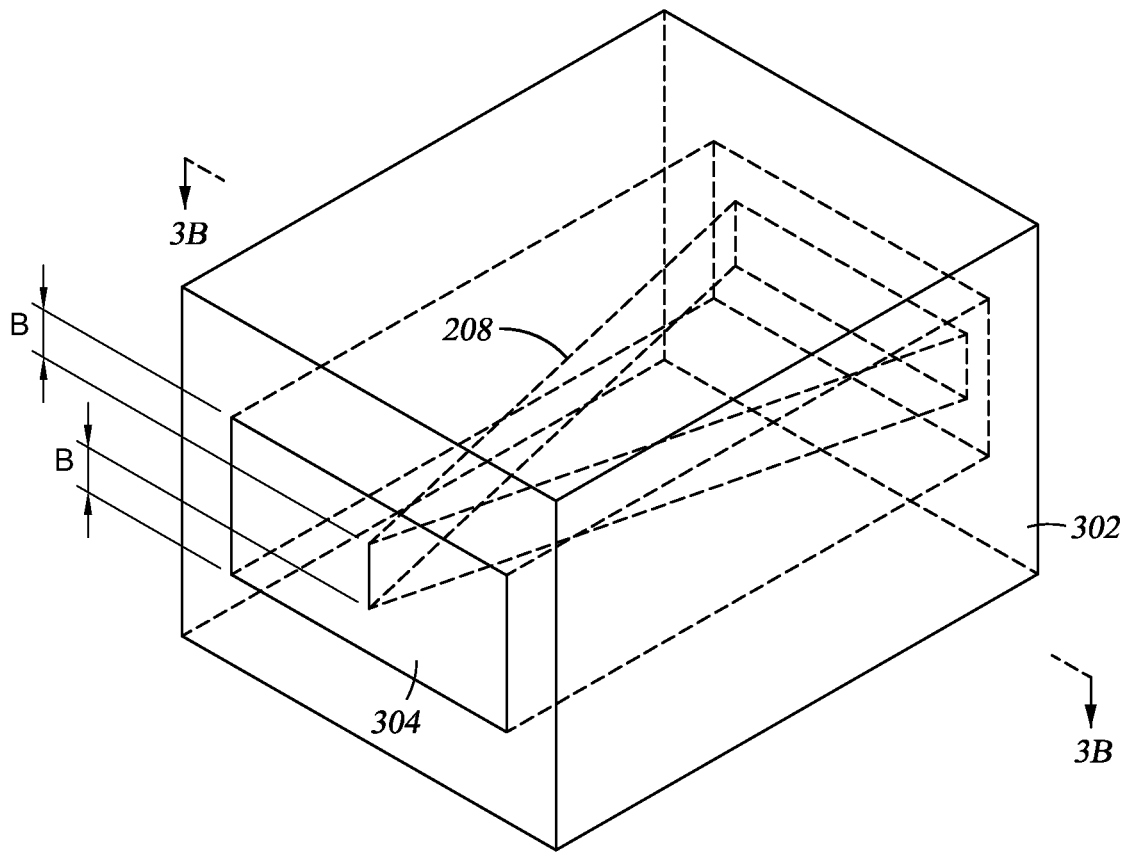
FIG. 3A is a schematic isometric illustration of an SSC according to another embodiment.
Figure 3B:
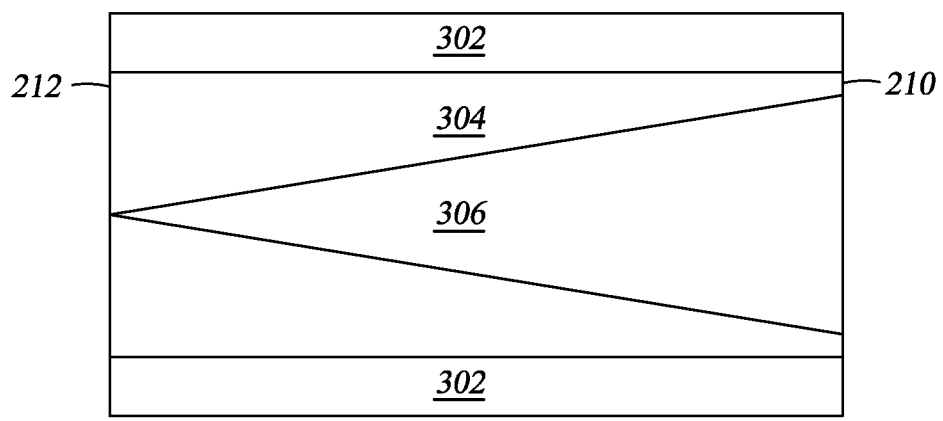
FIG. 3B is a schematic top cross sectional illustration of the SSC of FIG. 3A.

FIG. 3A is a schematic isometric illustration of an SSC 300 according to another embodiment. FIG. 3B is a schematic top cross sectional illustration of the SSC 300 of FIG. 3A. In the embodiment shown in FIGS. 3A and 3B, the SSC 300 has a two dimensional confinement. As shown in FIGS. 3A and 3B, the secondary confinement material 304 is surrounded by cladding 302 and the core 306 is surrounded by the secondary confinement material 304. As in FIGS. 2A and 2B, the core 306 is isolated from the cladding 302 and is equally spaced from the cladding 302 in one dimension (i.e., vertical) as shown by arrows "B". In other words, the core 306 is symmetrically disposed in the secondary confinement material 304 within the cladding 302. The materials and indices of refraction for the cladding 302, secondary confinement material 304 and the core 306 are as described above with reference to FIGS. 2A and 2B.

For the SSC 300, stray light that is not coupled into the tapered core 306 is prevented from spreading in both the vertical and lateral directions and is index-guided along the slider in a multimode secondary waveguide. The conversion efficiency for the SSC 300 is about 60 percent. The secondary confinement material 304 assists in coupling the light into the tapered core and leads to a significant increase in conversion efficiency with the extra dimension of confinement.

While there are benefits to secondary confinement, utilizing the secondary confinement material can increase the background radiation at the ABS by keeping stray light in the proximity of the taper. The stray light may not have the correct spatial profile to drive the plasmonic resonances in the NFT and could therefore simply heat the antenna and cause the device to fail. Confinement could also result in significant fluxuations of light distribution along the slider length. The fluxuations are between a strongly confined mode in the core taper and weakly confined modes guided in the secondary waveguide. The field distribution fluctuates between the two types of modes as the light propogates along the slider. As a result, a hybrid mode arrives at the NFT in one particular slider could be desirable for the particular slider, but the same mode in a different slider which has a different size could deliver different amounts of light into the NFT for the same input power. Therefore, to get a consistent and reliable performance, the fluctuations should be minimized.

Figure 4A:
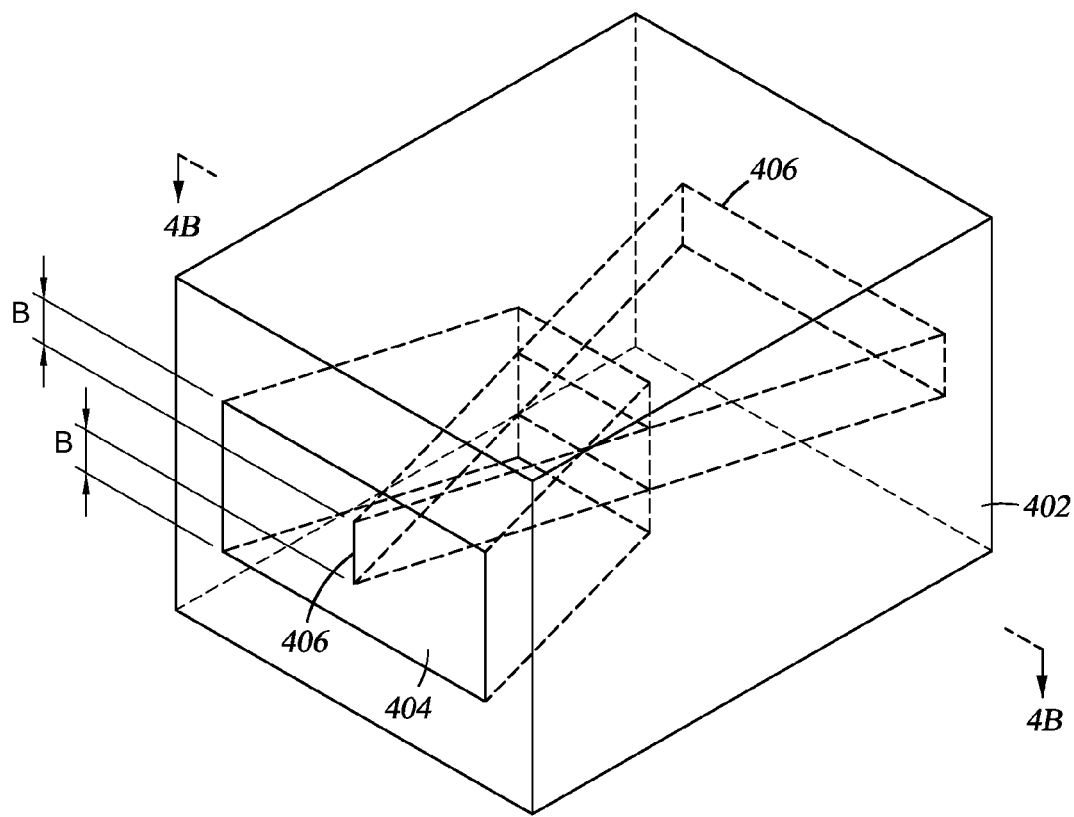
FIG. 4A is a schematic isometric illustration of an SSC according to another embodiment.
Figure 4B:
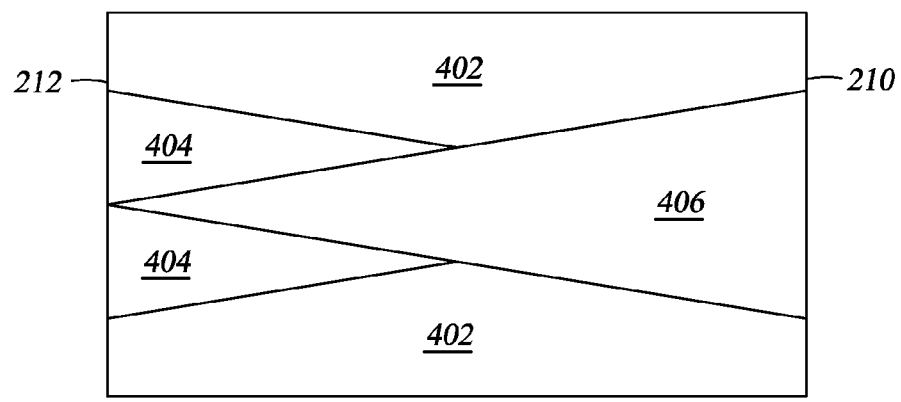
FIG. 4B is a schematic top cross sectional illustration of the SSC of FIG. 4A.

FIG. 4A is a schematic isometric illustration of an SSC 400 according to another embodiment in which the fluxuations are minimized. FIG. 4B is a schematic top cross sectional illustration of the SSC 400 of FIG. 4A. The SSC 400 contains a secondary confinement material 404 surrounded by the cladding 402. The core 406 is disposed within the secondary confinement material 404. Similar to FIGS. 2A and 2B, the core 406 is isolated from the cladding 402 and is equally spaced from the cladding 402 in one dimension (i.e., vertical) as shown by arrows "C". In other words, the core 406 is symmetrically disposed in the secondary confinement material 404 within the cladding 402. The materials and indices of refraction for the cladding 402, secondary confinement material 404 and the core 406 are as described above with reference to FIGS. 2A and 2B.

For the embodiment shown in FIGS. 4A and 4B, the secondary confinement material 404 has a taper that is inverse to the taper of the core 406. The shape of the secondary confinement material 404 affects the fluxuations. Because of the inverse taper, the conversion efficiency is preserved and the fluxuations are minimized so that a consistent light is delivered from the same source. The secondary confinement material 404 effectively focuses the background light to recapture the stray light that makes up the background light.

Figure 5A:
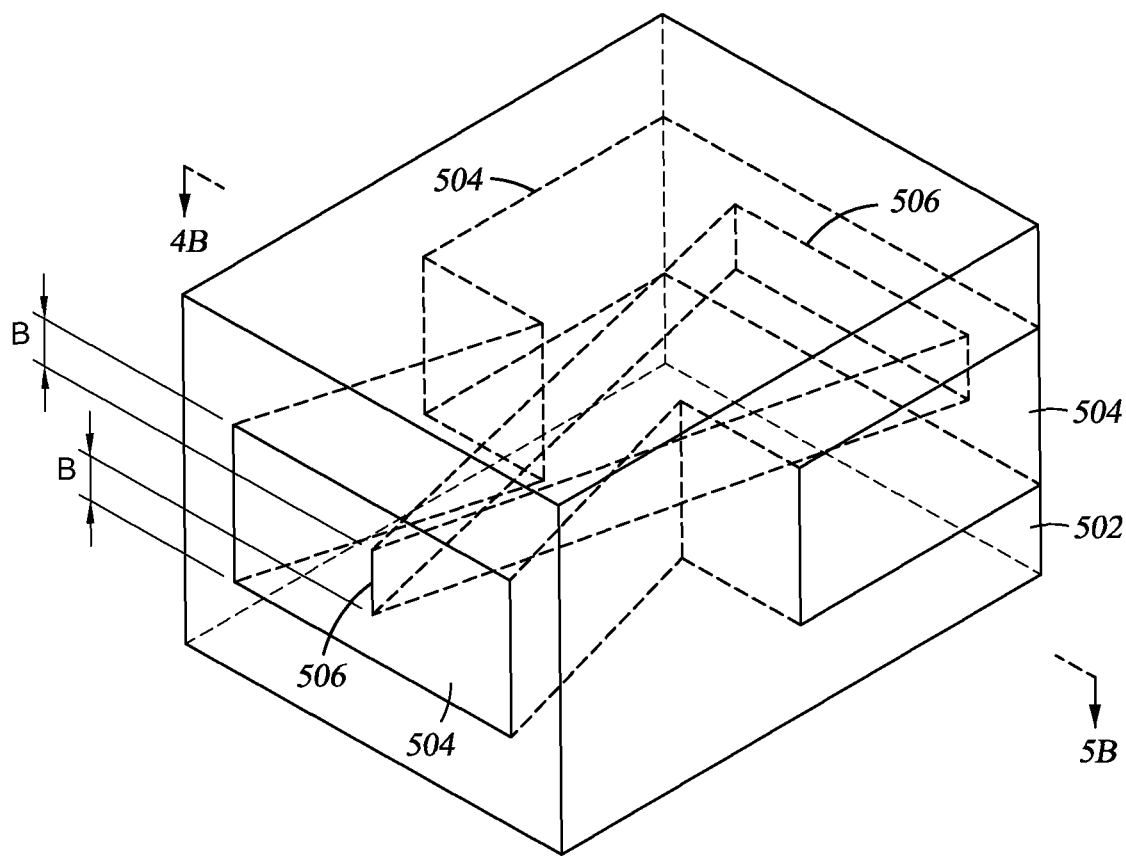
FIG. 5A is a schematic isometric illustration of an SSC according to another embodiment.
Figure 5B:
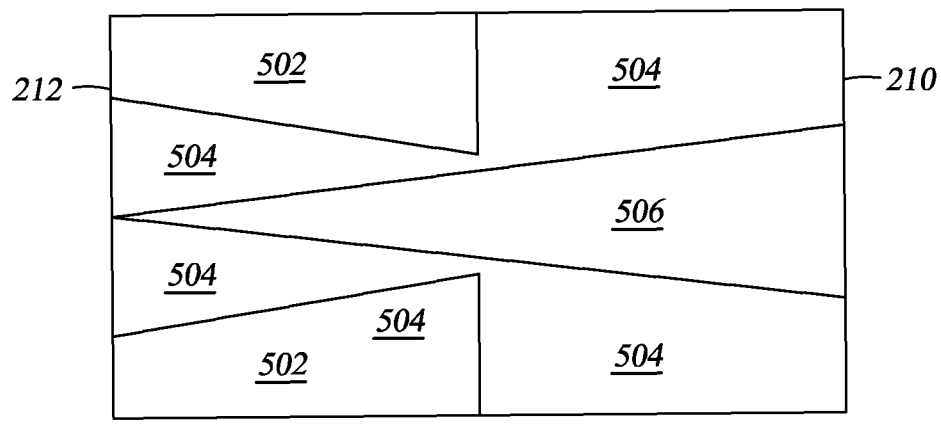
FIG. 5B is a schematic top cross sectional illustration of the SSC of FIG. 5A.

FIG. 5A is a schematic isometric illustration of an SSC 500 according to another embodiment. FIG. 5B is a schematic top cross sectional illustration of the SSC 500 of FIG. 5A. The SSC 500 contains a secondary confinement material 504 surrounded by the cladding 502. The core 506 is disposed within the secondary confinement material 504. Similar to FIGS. 2A and 2B, the core 506 is isolated from the cladding 502 and is equally spaced from the cladding 502 in one dimension (i.e., vertical) as shown by arrows "D". In other words, the core 506 is symmetrically disposed in the secondary confinement material 504 within the cladding 502. The materials and indices of refraction for the cladding 502, secondary confinement material 504 and the core 506 are as described above with reference to FIGS. 2A and 2B.

In the embodiment shown in FIGS. 5A and 5B, the secondary confinement material 504 has a taper only to a certain section of the slider. The secondary confinement 504 is tapered until about halfway across the length of the SSC 500. The taper couples light into the first part of the core 506 with two dimensional confinement but then releases the light into a one dimensional confinement in the other half of the SSC so that any background light in the proximity of the waveguide is reduced. The conversion efficiency is about 63 percent, but the intensity fluxuations are virtually eliminated and the stray light in the proximity of the taper are greatly reduced.

Figure 6:
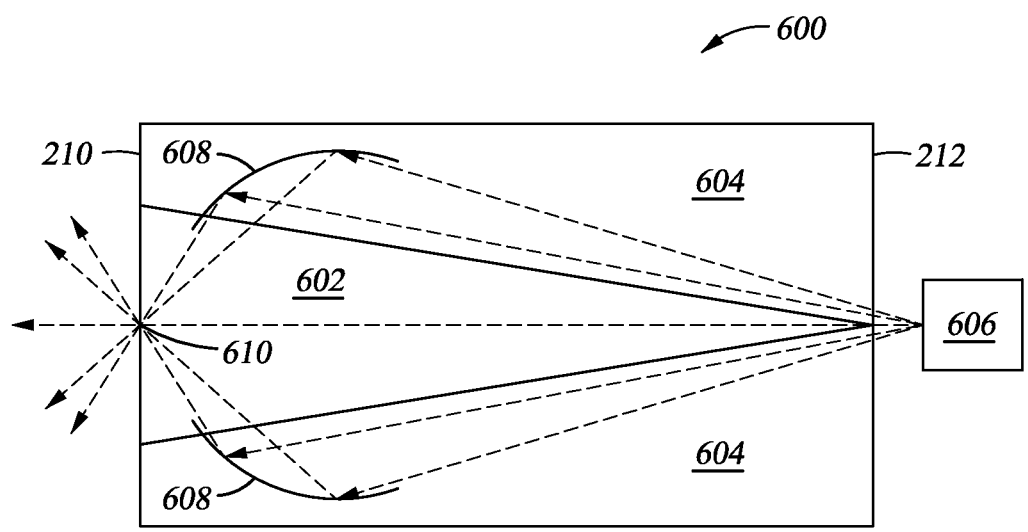
FIG. 6 is a schematic top cross sectional illustration of an SSC according to another embodiment.

FIG. 6 is a schematic top cross sectional illustration of an SSC 600 according to another embodiment. In the SSC 600 of FIG. 6, the core 602 is disposed in the cladding 604, but curved reflectors 608 are used to focus stray light from the light source 606. The stray light is focused at a focal point 610 at the second end 210 of the SSC 600. The core 602 and cladding 604 may comprise materials and indices of refraction as discussed above with regards to FIGS. 2A and 2B. The reflectors 608 may comprise metals such as silver or any reflecting metal.

It should be noted that in the embodiments shown and described herein, the core is symmetrically disposed in the secondary confinement material, as opposed to asymmetrically disposed. The symmetric confinement exhibits higher conversion efficiency for a given taper length. For an asymmetric confinement (i.e., core is not isolated from cladding), the small spatial overlap between the weekly confined modes and the mode guided in a given taper length results in weak coupling and longer coupling lengths for the stray light as opposed to symmetric confinement discussed and shown above. The symmetrical secondary confinement increases the efficiency of HAMR light delivery systems.

While the foregoing is directed to embodiments of the present invention, other and further embodiments of the invention may be devised without departing from the basic scope thereof, and the scope thereof is determined by the claims that follow.

What is claimed is:

1. A heat assisted magnetic recording device, comprising:
   a spot size converter, wherein the spot size converter includes:
      a first cladding;
      a secondary confinement material disposed on the first cladding;
      a second cladding disposed on the secondary confinement material; and
      a core disposed within the secondary confinement material such that the core is spaced from both the first cladding and the second cladding;
   a waveguide coupled to the spot size converter; and
   a near field transducer coupled to the waveguide.

2. The heat assisted magnetic recording device of claim 1, wherein the first cladding has a first index of refraction, the secondary confinement material has a second index of refraction and the core has a third index of refraction and wherein the first, second and third indices of refraction are different.

3. The heat assisted magnetic recording device of claim 2, wherein the third index of refraction is greater than the second index of refraction.

4. The heat assisted magnetic recording device of claim 3, wherein the second index of refraction is greater than the first index of refraction.

5. The heat assisted magnetic recording device of claim 4, wherein the core has a tapered shape.

6. The heat assisted magnetic recording device of claim 5, wherein the secondary confinement material has an inverted tapered shape relative to the tapered shape of the core.

7. The heat assisted magnetic recording device of claim 6, wherein the core is spaced from both the first cladding and the second cladding by an equal distance.

8. The heat assisted magnetic recording device of claim 7, wherein the core comprises tantalum pentoxide.

9. The heat assisted magnetic recording device of claim 8, wherein the secondary confinement material comprises silicon oxynitride.

10. The heat assisted magnetic recording device of claim 1, wherein the core is spaced from both the first cladding and the second cladding by an equal distance.

11. The heat assisted magnetic recording device of claim 10, wherein the core comprises tantalum pentoxide.

12. The heat assisted magnetic recording device of claim 11, wherein the secondary confinement material comprises silicon oxynitride.

13. The heat assisted magnetic recording device of claim 1, wherein the core comprises tantalum pentoxide.

14. The heat assisted magnetic recording device of claim 13, wherein the secondary confinement material comprises silicon oxynitride.

15. A heat assisted magnetic recording device, comprising:
   a spot size converter, wherein the spot size converter includes:
      a first cladding;
      a secondary confinement material disposed on the first cladding, wherein the secondary confinement material is tapered;
      a second cladding disposed on the secondary confinement material; and
      a core disposed within the secondary confinement material such that the core is spaced from both the first cladding and the second cladding, wherein the core has a taper that is inverse to the taper of the secondary confinement material;
   a waveguide coupled to the spot size converter; and
   a near field transducer coupled to the waveguide.

16. The heat assisted magnetic recording device of claim 15, wherein the core is spaced from both the first cladding and the second cladding by an equal distance.

17. The heat assisted magnetic recording device of claim 16, wherein the core comprises tantalum pentoxide.

18. The heat assisted magnetic recording device of claim 17, wherein the secondary confinement material comprises silicon oxynitride.

19. The heat assisted magnetic recording device of claim 15, wherein the core comprises tantalum pentoxide.

20. The heat assisted magnetic recording device of claim 19, wherein the secondary confinement material comprises silicon oxynitride.

* * * * *